SIGNAL-TRANSLATING APPARATUS
Filed Dec. 1, 1958 2 Sheets-Sheet 1
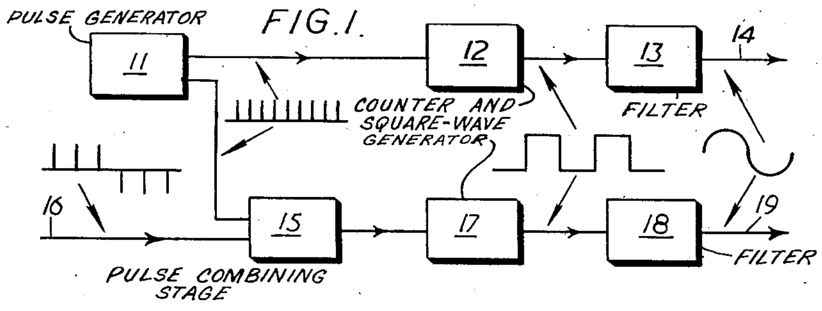
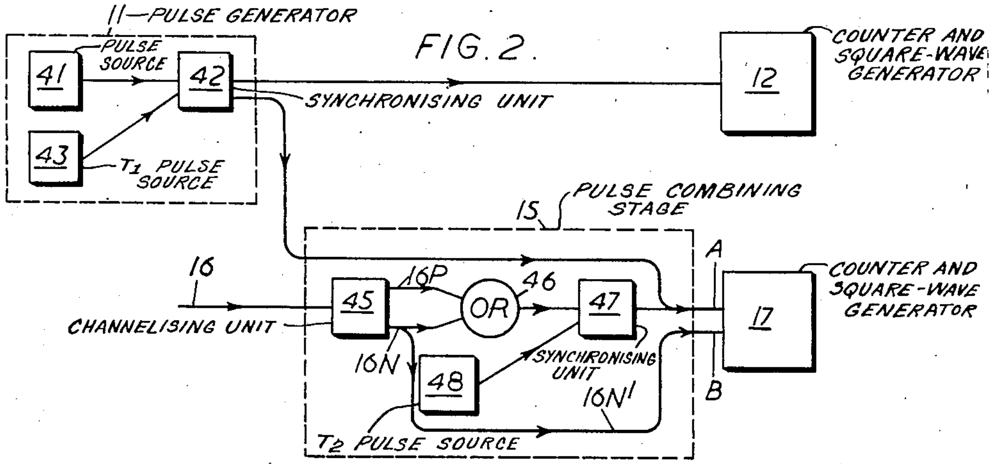
FIG. 3.
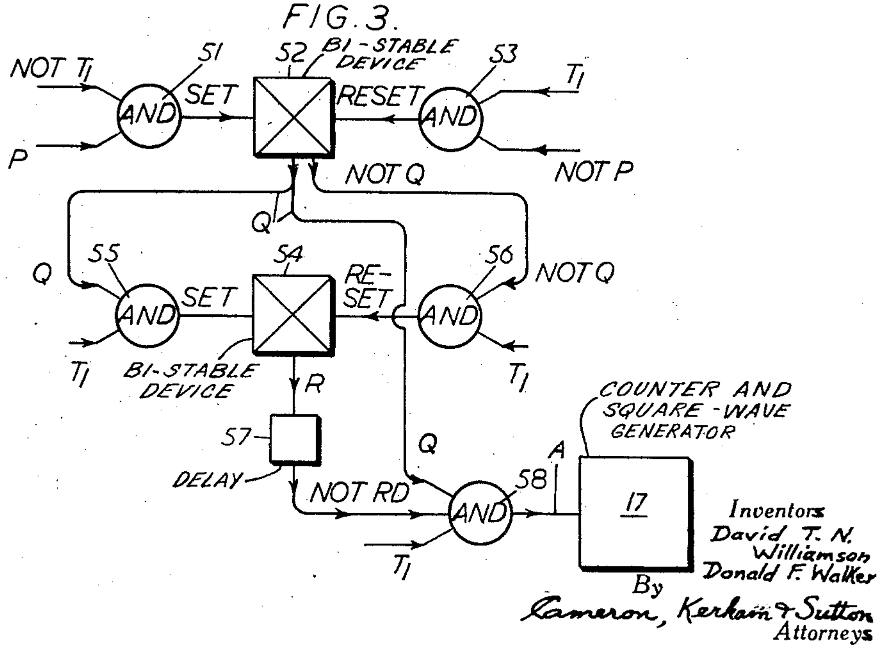
Inventors
David T. N. Williamson
Donald F. Walker
By Cameron, Kerkam & Sutton
Attorneys Inventors
David T. N. Williamson
Donald F. Walker
By
Cameron, Kerkam & Sutton
Attorneys 2,983,872
Patented May 9, 1961

1

2,983,872

SIGNAL-TRANSLATING APPARATUS

David Theodore Nelson Williamson, Polton, Midlothian, and Donald Ferguson Walker, Barnton, Midlothian, Scotland, assignors to Ferranti, Limited, Hollinwood, England, a company of Great Britain and Northern Ireland Filed Dec. 1, 1958, Ser. No. 777,351

Claims priority, application Great Britain Nov. 27, 1956

5 Claims. (Cl. 328—27)

Figure 3A:
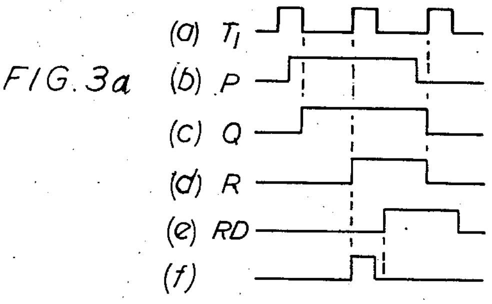

This invention relates to signal-translating apparatus for converting information received in the form of a train of electrical pulses some of positive and some of negtive sense and each representing a fixed unit of information and converting that information to the form of a sinusoidal signal phase-modulated with respect to a reference sinusoidal signal.

This application is a continuation-in-part of co-pending application Serial No. 699,294, filed November 27, 1957, now abandoned.

The invention has particular but not exclusive application to machine-tool control where each pulse represents a discrete movement of predetermined extent in one or other direction along a given axis of a machine tool or workpiece to be controlled.

Certain forms of computer used for machine-tool control supply an output in the form of recorded pulses of the kind described above, whereas certain forms of machine tool require the recorded information to be in the form of a sinusoidal signal which is phase-modulated with respect to a reference sinusoidal signal. In this case it may be necessary to convert the information from pulse form to phase-modulated form, and an object of the invention is to provide apparatus for doing this.

In the accompanying drawings,

Figure 1 is a schematic diagram of an embodiment of the invention, with the voltage waveforms at various points in the circuit being approximately indicated, And Figures 2 to 5 are diagrams in greater detail of some of the components shown generally in Figure 1.

The invention will now be described by way of example as applied to a machine-tool control system. The control information is provided in the form of an input train of pulses some of positive and some of negative sense and each representing a discrete movement of the tool in one or other direction, as the case may be. On the other hand the machine itself requires for its control a sinusoidal signal that is phase-modulated with respect to a reference sinusoidal signal of constant frequency F cycles per second. A tool movement that is represented by a phase shift of 360 degrees is to be represented by N pulses.

Signal-translating apparatus in accordance with the invention includes a generator 11 (see Fig. 1) of electrical pulses of constant sense and having a constant repetition frequency NF pulses per second.

The generator pulses are applied to a combined counter and squarewave-generator 12 designed to count the pulses received and switch its output voltage sequentially between limits +V to −V after every $N/2$ pulses. Various known combinations of counter and bi-stable circuit may be used for this purpose. A symmetrical rectangular waveform of frequency F is thus generated. This waveform is applied to a filter 13 which has a high attenuation at third and subsequent harmonics and which accordingly produces over an output channel 14 a reference sinusoidal signal of frequency F in phase with the rectangular waveform. This signal is clearly such that the number of

2 generator pulses which are received during each half cycle of the signal has the constant value $N/2$.

The generator pulses are also applied to an interlacing stage 15 where they are interlaced with the incoming pulses to be converted, delivered over an input channel 16, the arrangement being such that no pulses are lost through being superimposed.

The combined train of pulses thus produced is applied to a second combination of pulse-counter and squarewave-generator 17 which counts the pulses in this train algebraically, subtracting from the count each pulse of the incoming train which is of opposite sense to that of the generator pulses, and switches its output sequentially between +V and −V every time the algebraic sum comes to $N/2$ pulses. The arrangement is similar to the counter and squarewave-generator 12, except that in the present case the counted pulses are not arriving at a constant repitition frequency and that, as some pulses are negative, the counter subtracts as well as adds. Stage 17 is followed by a filter 18 having identical properties to the first filter. Another sinusoidal signal—the control signal—is thus produced, over an output channel 19, the phase of which signal with respect to the reference signal clearly varies in dependence on the input train of pulses, N of which correspond to a phase shift of a whole cycle, i.e. 360 degrees.

The two signals may be recorded on separate tracks on a magnetic tape in the usual way.

The two filters 13 and 18 require phase correction over a band of about 30 c./s. centered on the frequency F of the reference sinusoidal signal.

Where more than one input train of pulses are to be converted—for example, where the trains represent tool movements along each of three mutually perpendicular axes—the same sinusoidal reference signal may be used for all three; generator 11, together with its counter and squarewave-generator 12 and the filter 13, would thus be common to the channels in which the incoming pulses are converted to sinusoidal signals, each of which channels would otherwise be as described above.

It is of course unnecessary to supply a special pulse generator where, as is sometimes the case, a suitable train of pulses at the appropriate repetition frequency is already available in the computer or in other associated apparatus.

Details of the components referred to generally above will now be described with reference to Figs. 2 to 5, in which the components previously mentioned are given the same reference numbers as before.

To ensure that no pulses are lost through some of the generator pulses being superimposed on—that is, coincident with—some of the input pulses before reaching stage 17, generator 11 and combining stage 15 are arranged as follows.

Generator 11 consists of a source 41 of pulses the length of which will be indicated shortly. These are applied to a first synchronising unit 42, together with a train of timing pulses $T_1$ derived from some source 43. Pulses $T_1$ have a greater repetition frequency and are of shorter length than the pulses from source 41. The output from unit 42 is applied to stage 12, the action of unit 42 being to deliver to stage 12 one pulse of the $T_1$ train, and one such pulse only, for each pulse applied to the unit from source 41. A suitable circuit for this purpose is described below.

Stage 15 includes at 45 a channelising unit whereby the incoming pulses arriving over channel 16 are directed into one or other of channels 16P or 16N according to whether the input pulses are of positive or negative sense. Channels 16P and 16N are connected through an OR gate 46 to a second synchronising unit 47, to which is also applied a train of timing pulses $T_2$ derived from some source 48. The output from unit 47 is applied to the ADD input rail A of the counter of stage 17; also applied to this rail is an output connection from synchronising unit 42 of generator 11. Channel 16N, in addition to being connected to OR gate 46, is connected by way of a channel 16N[1] to the SUBTRACT input rail B of the counter of stage 17.

Unit 47 operates similarly to unit 42 to convert each pulse received from channel 16P or 16N by way of gate 46 to the form of a single pulse of the train of $T_2$ timing pulses, and apply this pulse to the counter of stage 17. The essential requirements for the two trains of timing pulses $T_1$ and $T_2$ are that the pulses of one train are of the same sense as but to no extent coincide with the pulses of the other train. The two trains should furthermore have the same, or almost the same, repetition frequency, and their respective pulses should conveniently be of the same width.

The counter component of stage 17 is of the known kind which adds pulses received on rail A in the absence of a controlling waveform on rail B, but subtracts pulses received on rail A when such a waveform is present on rail B.

In operation, each pulse from stage 11 is applied to stage 12 and also to the A rail of stage 17, to be added by the counters of each of these stages as above described with reference to Fig. 1. Each positive input pulse from the tape, acting by way of channel 16P, gate 46, and unit 47, also causes a pulse to be applied for addition to rail A of stage 17. It will be appreciated that as each pulse from unit 42 is a $T_1$ pulse and each pulse from unit 47 is a $T_2$ pulse, and as these pulses are arranged never to coincide with one another, no pulses can be lost through being superimposed before reaching stage 17.

Each negative input pulse from the tape reaches rail A in the form of a $T_2$ pulse from unit 47 just as in the case of a positive input pulse. In the present case, however, there is present on rail B a control waveform in the shape of a negative pulse applied direct from channel 16N by way of channel 16N[1]. Hence the response of the counter of the stage is to subtract this pulse.

The operation of the remainder of the equipment is as already described with reference to Fig. 1.

A suitable circuit for synchronising unit 42, together with a set of pulse waveforms to illustrate its operation, are shown in Figs. 3 and 3*a*. The function of the circuit, as already indicated, is to produce in response to each pulse P derived from source 41 a single $T_1$ pulse derived from source 43, and this is effected by means of a simple form of logical network of a kind similar to those used in digital computers. The $T_1$ pulses are shown in Fig. 3*a* at *a* and one of the pulses P from source 41 at *b*; the P pulses are given a length which is approximately the same as that of the pulses passed to synchronising unit 47 from stage 45.

The P pulses are applied as an input to an AND gate 51 together with a pulse signal which is present only throughout the absence of a $T_1$ pulse and which is accordingly indicated in Fig. 3 of the drawing by "Not $T_1$." The output from this gate is applied to the SET input of a device 52 having two stable states labelled SET and RESET. To the RESET input of the device is applied the output from another AND gate 53 to the two inputs of which are applied the $T_1$ pulses and a pulse signal "Not P" which is present only throughout the absence of a P pulse from source 41.

The output Q—see waveform *c* in Fig. 3*a*—from device 52, which is of the same sense as pulses $T_1$ and P when the device is in its SET condition, is applied with the $T_1$ pulses to the SET input of another two-state device 54 by way of an AND gate 55. To the RESET input of the device 54 is applied the output from another AND gate 56 to the two inputs of which are applied to $T_1$ pulses and a pulse signal "Not Q" which is the output from device 52 when in its RESET condition.

The output R—see waveform *d* in Fig. 3*a*—from device 54, which is of the same sense as the other pulses when the device is in its SET condition, is applied to a delay stage 57 which imposes a delay of duration a little longer than the width of a T pulse and so produces a pulse waveform RD as shown at *e* in Fig. 3*a*. From this is derived a pulse "Not RD" which is present only when device 54 is in its RESET condition and which is applied as one of the inputs to a three-way AND gate 58 the other inputs of which are the pulses Q (from the output of device 52) and $T_1$. The output from this gate is applied on the input to rail A of stage 17.

In operation, each Q pulse is initiated, as shown at *c*, by the presence of a P pulse in the absence of a $T_1$ pulse, and is terminated by the leading edge of the first $T_1$ pulse which occurs after the termination of that Q pulse. Each R pulse is initiated by the leading edge of the first $T_1$ pulse which coincides with the Q pulse and is terminated by the leading edge of the first $T_1$ pulse which follows the end of the Q pulse. From each R pulse is derived a delayed pulse "Not RD" after an interval of the order stated. AND gate 58 passes a pulse to stage 17 only when a "Not RD" input coincides with a Q pulse and a $T_1$ pulse. Hence the pulse passed by the gate is in the form *f* of a T pulse spanned by the leading edges of the R and RD pulses. For each pulse P, therefore, a single $T_1$ pulse is derived, as was required.

The Q pulses are derived so as to prevent a response due to a partial overlap of a P and a $T_1$ pulse. The pulses R and RD are derived to prevent the derivation of more than one T pulse if the P pulse should fully span more than one T pulse; hence the R and RD pulses, and components 54 to 57, would not be required where the P pulses are short enough never to span more than one $T_1$ pulse.

A similar circuit is provided for synchronising unit 47, the only differences being that the input pulses are those derived from the tape by way of stage 45 and OR gate 46, and the T pulses are now the $T_2$ pulses.

Figure 4:
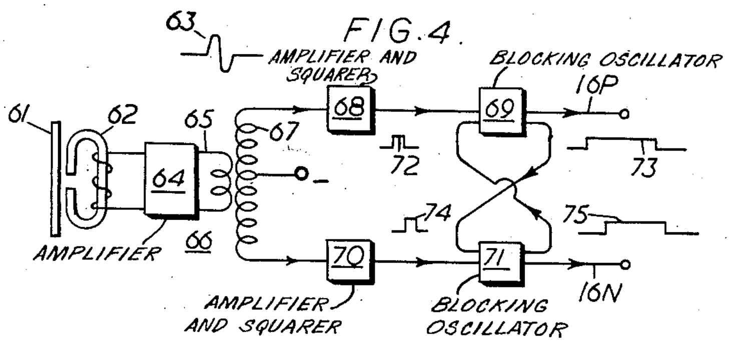

Suitable apparatus for stage 45 to separate into channels 16P and 16N the positive and negative pulses derived from magnetic tape where the senses are distinguished by the direction of the flux is shown in Fig. 4.

The pulses are derived from tape 61 by means of a conventional magnetic pickoff 62 the output from which is in the form of a differentiated rectangular wave, as depicted at 63 for the case where the recorded pulse is positive. After amplification at a stage 64 the pulses are applied to the primary 65 of a transformer 66 the secondary 67 of which is connected at a centre tap to a source of negative bias. One end of secondary 67 is connected to a combined amplifier and squarer stage 68 and thence to a blocking oscillator 69. The other end of secondary 67 is similarly connected to a combined amplifier and squarer stage 70 and a blocking oscillator 71. The positive-going outputs from oscillators 69 and 71 are delivered over channels 16P and 16N respectively. These oscillators are interconnected in known manner so that each negative-going output (these occur simultaneously with the positive-going outputs but at another output point) is applied to the other oscillator to inhibit its triggering.

In operation, when a recorded positive pulse reaches pickoff 62 the output therefrom consists of a positive half-cycle closely followed by a negative half-cycle, as depicted at 63. It is assumed that the connections to transformer 66 are such that in response to this leading positive half-cycle the potential of the upper end (as depicted) of secondary 67 swings positively and the other end negatively. The effect of the negative bias at the centre tap is such that this half-cycle renders amplifier 68 conductive but maintains amplifier 70 non-conductive. An output rectangular pulse 72 is thus delivered to trigger oscillator 69, thereby initiating the derivation of an output pulse 73 of increased length, applied over output channel to P, the interconnections between the oscillators being such that for the duration of pulse 73 oscillator 71 is inhibited from being triggered.

The effect of the immediately ensuing negative half-cycle of the output from the pickoff is to render amplifier 70 conductive and amplifier 68 non-conductive. An output rectangular pulse 74, closely following pulse 72, is accordingly delivered by amplifier 70 to oscillator 71, but fails to trigger the oscillator as the pulse 74 falls within the inhibiting period of pulse 73.

In response to a recorded positive pulse, therefore, an output pulse is delivered over channel 16P and over that channel only.

The operation is similar when the recorded pulse is negative. The response of pickoff 62 is now a negative half-cycle followed closely by a positive half-cycle. As a result, amplifier 70 is energised before amplifier 68, oscillator 71 is triggered before oscillator 69, and an output pulse 75, of the same length as pulse 73, is delivered over channel 16N only.

The actual polarity of the pulses 73 and 75 in channels 16P and 16N may be whatever suits the other components of the apparatus. It will be appreciated that these pulses after passing through OR gate 46 (see Fig. 2) become the pulses applied to synchronising unit 47 (the equivalent of pulses P of Fig. 3*a*) and so should be of the same sense as the timing pulses $T_2$.

Figure 5:
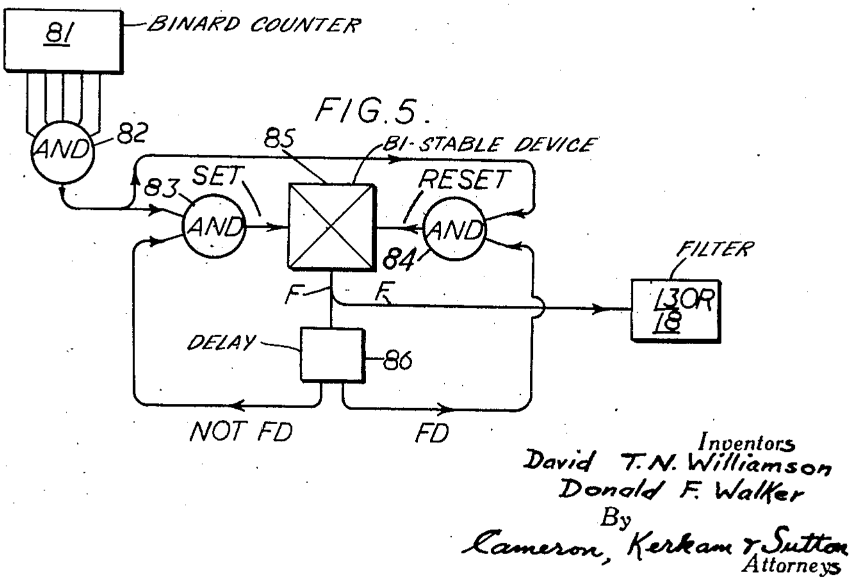

The combined pulse-counter and square-wave generator 12 or 17 may be as shown in Fig. 5.

The counter itself, which may be of the dekatron type, is shown at 81. From it connections are taken to an AND gate 82 so that the gate passes a pulse only when the count has the predetermined value $N/2$. The output from this gate is applied as one of the two inputs to each of two further AND gates 83 and 84 the outputs from which are applied to the SET and RESET inputs of a device 85 having those two stable states. The output F from this device after delay at a delay stage 86 is applied in one and in the other sense, respectively (indicated in the figure by "FD" and "Not FD"), to the other inputs of gates 84 and 83, thereby ensuring that the consecutive outputs from gate 82 alternately trigger the device from one stable state to the other. This produces a rectangular waveform at the output F, which is applied to filter stage 13 or 18, as the case may be, to produce the required sinusoidal signal each half-cycle of which is generated by $N/2$ pulses.

What we claim is:

1. Signal translating apparatus for receiving information in the form of a train of electrical input pulses some of positive sense and some of negative sense and converting that information to the form of a control sinusoidal signal phase-modulated with respect to a reference sinusoidal signal including a generator of electrical pulses of constant sense and constant repetition frequency, a combined pulse-counter and wave-generator stage for deriving from the generator pulses a reference sinusoidal signal such that the number of generator pulses which are received during each half-cycle of the reference signal has a constant value, a combining stage for interlacing the generator pulses with said input pulses to produce a combined train of pulses, and a further combined pulse-counter and wave-generator stage for deriving from said combined train of pulses said control signal such that the algebraic sum of the pulses of the combined train which are received during each half-cycle of the control signal has said constant value.

2. Apparatus as claimed in claim 1 wherein each of said combined pulse-counter and wave-generator stages includes a pulse counter arranged to switch its output from one to the other of fixed voltage levels after recepit of said constant number of pulses, and an attenuating filter for deriving the sinusoidal signal from the voltage output from said counter.

3. Apparatus as claimed in claim 1 wherein said combining stage includes a source of timing pulses having the same sense as said generator pulses but being to no extent coincident with them, and a synchronising unit connected to said source to receive the timing pulses and arranged to receive said input pulses, said unit including a logical network for converting each of said input pulses to the form of a said timing pulse.

4. Apparatus as claimed in claim 3 wherein said logical network includes a two-state device having SET and RESET stable states, a first AND gate connected to receive each of said input pulses and connected to said source to receive a first pulse signal throughout the absence of any timing pulse, a second AND gate connected to said source to receive each of said timing pulses and connected to receive a second pulse signal throughout the absence of a said input pulse, connections from the gates to apply the outputs thereof to said device to trigger it from the RESET to the SET condition when an input pulse coincides with a said first signal at the first gate, and to trigger it from the SET to the RESET condition when a timing pulse coincides with a said second signal at the second gate, a third AND gate connected to said source to receive each of said timing pulses and connected to said two-state device to receive the output thereof, said third gate deriving an output pulse when a timing pulse occurs whilst the device is in its SET condition, and output connections from the third gate to the appropriate one of said pulse counters.

5. Apparatus as claimed in claim 1 wherein said combining stage includes a stage for separating said input pulses into separate channels according as the pulses are of positive sense or negative sense, for application to the ADD and SUBTRACT inputs of the pulse counter.

References Cited in the file of this patent

UNITED STATES PATENTS

| | | |
|---|---|---|
| 2,113,214 | Luck | Apr. 5, 1938 |
| 2,537,427 | Seid et al. | Jan. 9, 1951 |
| 2,833,941 | Rosenberg et al. | May 6, 1958 |